United States Patent [19]
Butler

[11] Patent Number: 5,901,551
[45] Date of Patent: *May 11, 1999

[54] CONVERGING CONSTRICTOR FOR AN ELECTROTHERMAL ARCJET THRUSTER

[75] Inventor: George W. Butler, Seattle, Wash.

[73] Assignee: Primex Technologies, Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/685,877

[22] Filed: Jul. 24, 1996

Related U.S. Application Data

[63] Continuation of application No. 08/327,946, Oct. 24, 1994, abandoned.

[51] Int. Cl.$^6$ .................................................. F03H 1/00
[52] U.S. Cl. ................................. 60/203.1; 219/121.48; 219/121.5
[58] Field of Search .................... 60/201, 202, 203.1; 219/121.11, 121.48, 121.5

[56] References Cited

U.S. PATENT DOCUMENTS

| | | |
|---|---|---|
| 3,297,899 | 1/1967 | Pratt et al. ........................ 219/121.11 |
| 3,308,623 | 3/1967 | Ferrie et al. ........................... 60/203.1 |
| 4,322,946 | 4/1982 | Murch et al. . |
| 4,523,429 | 6/1985 | Bingley . |
| 4,548,033 | 10/1985 | Cann . |
| 4,800,716 | 1/1989 | Smith et al. . |
| 4,805,400 | 2/1989 | Knowles . |
| 4,866,929 | 9/1989 | Knowles . |
| 4,882,465 | 11/1989 | Smith et al. . |
| 4,907,407 | 3/1990 | Simon et al. .......................... 60/203.1 |
| 4,926,632 | 5/1990 | Smith et al. . |
| 4,995,231 | 2/1991 | Smith et al. . |
| 5,079,403 | 1/1992 | Sturges et al. ..................... 219/121.48 |
| 5,111,656 | 5/1992 | Simon et al. . |
| 5,319,926 | 6/1994 | Steenborg . |
| 5,640,843 | 6/1997 | Aston ................................... 60/203.1 |

OTHER PUBLICATIONS

Wallner et al., "Arcjet Thruster for Space Propulsion" appearing in NASA Tech Note D–2868, Jun. 1965, pp. 1–69.
Esker, "Comparison of Arcjet Exhaust Velocity with the Propagation Velocity of Random Light Fluctuations" appearing in J. Spacecraft, May 1967, pp. 685–687.
Jahn, "Physics of Electric Propulsion", Chapter 6, Electrothermal Acceleration, published by McGraw–Hill Book Company, 1968, pp. 91–131.
Hoskins et al., "A Comparison of Regenerative and Conventional Arcjet Performance", published by the American Institute of Aeronautics and Astronautics, 1994, pp. 1–11.

*Primary Examiner*—Charles G. Freay
*Assistant Examiner*—Ted Kim
*Attorney, Agent, or Firm*—Gregory S. Rosenblatt; William B. Slate; Wiggin & Dana

[57] ABSTRACT

There is provided an anode for an electrothermal arcjet thruster. A conduit running through the anode body has a converging upstream portion and a diverging downstream portion connected by a constrictor portion having a greater diameter at the interface with the upstream portion than at the interface with the downstream portion. As the result, the cross-sectional area available to a propellant gas passing through the constrictor constantly decreases and the propellent gas velocity continually increases. This constrictor geometry allows the arcjet thruster to be operated at a lower mass flow rate increasing the obtainable specific energy.

20 Claims, 3 Drawing Sheets

CONVERGING CONSTRICTOR FOR AN ELECTROTHERMAL ARCJET THRUSTER

CROSS REFERENCE TO RELATED APPLICATIONS

This application is a continuation of application Ser. No. 08/327,946 filed Oct. 24, 1994, now abandoned. That parent application is incorporated herein by reference in its entirety.

BACKGROUND OF THE INVENTION

1. Field of the Invention

This invention relates to small propulsion systems for maneuvering spacecraft and, more particularly to an electrothermal arcjet thruster having an anode with a centrally positioned constrictor. This constrictor converges from an upstream end to a downstream end. As the result, both the tangential and axial velocity of a propellant gas increase as the gas flows through the converging constrictor.

2. Description of the Prior Art

An electrothermal arcjet thruster converts electrical energy to thermal energy by heat transfer from an arc discharge to a flowing propellant. The thermal energy is converted to directed kinetic energy by expansion of the heated propellant through a nozzle.

Most electrothermal arcjet thrusters have as common features an anode in the form of a nozzle body and a cathode in the form of a cylindrical rod with a conical tip. The nozzle body has an arc chamber defined by a constrictor in a rearward portion of the body and a nozzle in a forward portion thereof. The cathode rod is aligned on the longitudinal axis of the nozzle body with its conical tip extending into the upstream end of the arc chamber in spaced relation to the constrictor so as to define a gap therebetween.

When a sufficiently high current is applied between the anode and the cathode, an electric arc is initiated. When the arc is initially struck, the electric current travels the path of smallest inductance (path of least resistance) between the cathode body (this portion of the arc is referred to as the "arc root") and the anode (this portion of the arc is referred to as the "arc foot").

In a typical arcjet configuration, the arc is believed to originate on the cathode shoulder, upstream of the cathode tip. Gas dynamic forces in concert with thermal effects, cause the arc root to move toward the cathode tip. At the same time, the arc foot is swept along the anode towards the anode portion of minimum cross-sectional area, the constrictor. Stable arcjet operation is achieved when the arc foot passes through the constrictor and is distributed diffusely, with a low energy density, along the diverging walls of the anode.

When in a stable operation mode, the propellant gas is heated in the regions of the constrictor and of arc diffusion at the mouth of the nozzle downstream from the constrictor. The super-heated propellant gas is exhausted out from the nozzle to achieve thrust.

Historically, propellants, such as ammonia or hydrogen, have been used in electrothermal arcjet thrusters. More recently, hydrazine ($N_2H_4$) has been used. Propellants such as ammonia and hydrazine are preferred because these propellants are storable as a liquid without refrigeration while cryogenic propellants such as hydrogen and helium are not. The liquid storable fuels are converted to a gaseous propellent by passing the fuel through a gas generator.

The specific impulse ($I_{sp}$) determines the propellant mass required to complete a flight. $I_{sp}$ is denoted in pounds of force-second per pound of mass. The generation of a high $I_{sp}$ in an arcjet thruster requires operation of the thruster at a high specific energy (as denoted in watts/kg). The cryogenic propellants have a typical $I_{sp}$ value of up to 1,500 lbf-sec/lbm. The liquid storable propellants have a much lower specific impulse, on the order of 800–1000 lbf-sec/lbm.

One way to increase $I_{sp}$ is to increase the thrust efficiency of the arcjet thruster. U.S. Pat. No. 5,111,656 to Simon et al. discloses increasing the specific impulse of a propellant by a unique nozzle configuration. The exhaust portion of the nozzle has a divergent recombination portion in tandem with a divergent expansion portion. The divergence of the recombination portion is less than that of the expansion portion, causing a temporary delay in the pressure reduction of the propellant gas. This delay creates a relatively high pressure region in the recombination portion of the nozzle permitting a partial recombination of the ionized and neutral species of the propellant gas and a partial recovery of frozen flow losses back into the gas.

U.S. Pat. No. 5,111,656 is incorporated by reference in its entirety herein. The biangle nozzle disclosed in that patent increases the efficiency of the electrothermal arcjet thruster at low power levels by reducing frozen flow losses. However, the nozzle also generates more heat at the anode surface and, as the energy level (power/mass flow rate) of the thruster increases, the advantage over a single angle nozzle decreases. At relatively high specific energy levels, the efficiency of a biangle nozzle is inferior to that of a single angle nozzle.

One method to limit the transfer of heat from the electric arc to the anode is disclosed in U.S. Pat. No. 4,800,716 to Smith et al. The Smith et al patent discloses forming a portion of the constrictor from an electrically insulating material such as boron nitride, alumina or berylia. However, the typical anode body is formed from tungsten or a tungsten alloy. Incorporating ceramic inserts into the metallic anode body increases both the complexity and the cost of manufacturing the anode. In addition, due to the high operating temperatures of the arcjet thruster, typically on the order of 1500K, coefficients of thermal expansion must be closely matched.

A different way to increase $I_{sp}$ is to reduce the mass flow rate while maintaining the power level. However, as the mass flow rate is reduced, the stabilizing gas dynamic forces diminish. Eventually, stable operation of the arcjet thruster ceases and the arc foot attachment moves upstream back through the constrictor to the point of smallest inductance along the converging upstream portion. Upstream arc attachment produces an unstable current/voltage condition, typically characterized by low voltage and high current requirements. Under these conditions, destructive energy densities are concentrated at the arc foot leading to erosion of the surface of the anode.

There exists, therefore, a need for an anode geometry permitting a reduction in the mass flow rate while inhibiting the upstream movement of the arc foot. Such an anode configuration would provide an arcjet thruster having a higher specific impulse with increased cathode and anode lifetimes.

SUMMARY OF THE INVENTION

Accordingly, it is an object of the invention to provide an anode for an electrothermal arcjet thruster that is capable of operation at reduced mass flow rates. It is a feature of the invention that the anode contains a converging upstream portion and a diverging downstream portion. A constrictor is disposed between and interconnects these two portions. The constrictor is converging, having a larger cross-sectional area at the end adjacent the upstream portion than the end adjacent to the downstream portion. It is a feature of the invention that the converging constrictor results in a continuous reduction in the available flow area from the cathode tip to the constrictor exit. As a result, the velocity of the gas flow, in both the tangential and axial directions constantly increases.

It is an advantage of the invention that increased tangential flow of the propellant gas limits transport of energy to the surfaces of the anode. Yet another advantage of the invention is that the increased tangential flow of the propellant gas centers the electric arc and retains the arc foot downstream of the constrictor. Yet another advantage of the invention is that arcjet start times are reduced for a given mass flow rate. Still another advantage of the invention is that both the cathode lifetime and the anode lifetime are increased.

In accordance with the invention, there is provided an anode for an electrothermal arcjet thruster. This anode has an electrically conductive body with a conduit extending therethrough. This conduit has a converging upstream portion and a diverging downstream portion. A constrictor portion has a first end adjacent to the converging upstream portion and an opposing second end adjacent to the diverging downstream portion. The diameter of the first end of the constrictor is greater than the diameter of the second end.

The above stated objects, features and advantages will become more apparent from the specification and drawings that follow.

DETAILED DESCRIPTION

Figure 1:
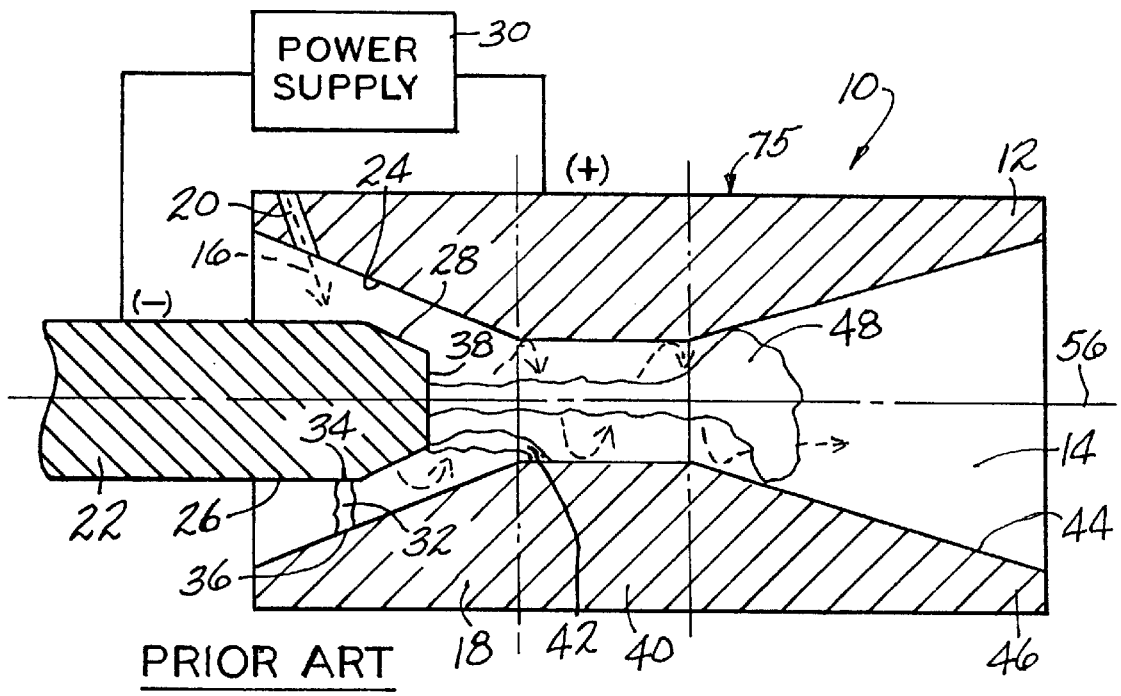
FIG. 1 shows in cross-sectional representation an electrothermal arcjet thruster in accordance with the prior art.

FIG. 1 shows in cross-sectional representation an electrothermal arcjet thruster 10 as known from the prior art. The arcjet thruster 10 has an anode body 12 formed from an electrically conductive, heat resistant metal or metal alloy such as tungsten or a tungsten alloy. A conduit 14 extends through the anode body 12 and directs a flowing propellant gas 16. The anode body 12 is arbitrarily divided into three portions separated in FIGS. 1 and 2 by phantom broken lines. A converging upstream portion 18 contains an opening 20 through which the propellant gas 16, such as hydrazine, is introduced at some point along the cathode shoulder. The angle of the opening 20 produces a high azimuthal component of velocity (swirl) near the anode wall and a gas density minimum along the arcjet longitudinal axis 56. As the propellant gas travels along the shoulder 26 of the cathode 22, the cross-sectional area of the conduit 14 decreases as the result of the convergence of the anode walls 24.

The cathode 22 is generally rod shaped and formed from a tungsten base alloy. The cathode 22 has a shoulder portion 26 and a converging tip portion 28. The angle of convergence of the cathode tip 28 typically matches the angle of convergence of the anode walls 24.

A power supply 30 establishes a voltage potential between the anode 12 and the cathode 22. When the current is sufficiently high, an electric arc 32 initiates across the path of smallest inductance, between the cathode shoulder 26 and the anode wall 24. The electric arc 32 has an arc root 34 adjacent the cathode and an arc foot 36 adjacent the anode. Propellant gas dynamic forces in concert with thermal effects cause the arc root 34 to move toward the cathode tip 38. At the same time, the arc foot 36 is swept along the anode wall 24 toward the region of minimum cross-sectional area, the constrictor 40. Reference numeral 42 represents an intermediate arc position.

Stable operation of the electrothermal arcjet thruster 10 is achieved when the arc foot 36 passes through the constrictor 40 and is distributed diffusely, that is with low energy density, along the diverging walls 44 of the divergent portion 46 of the anode. This electric arc is indicated by reference numeral 48.

If the mass flow rate of the propellant gas 16 is decreased, the gas dynamic forces that stabilize the electric arc 48 diminish and the arc reverts back to the position identified by reference numerals 36 or 42 producing an unstable and destructive current-voltage condition.

Figure 2:
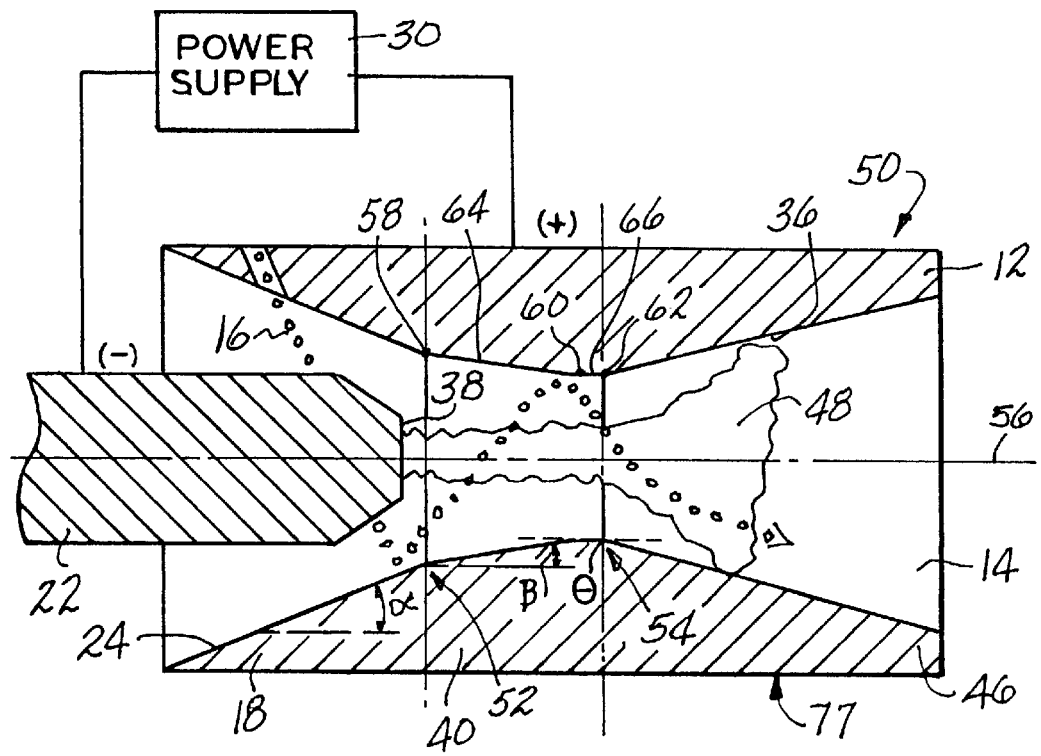
FIG. 2 shows in cross-sectional representation an electrothermal arcjet thruster in accordance with the present invention.

The deficiencies of the prior art electrothermal arcjet thruster are absent in the electrothermal arcjet thruster 50 of the invention illustrated in cross-sectional representation in FIG. 2. The electrothermal arcjet thruster 50 has an electrically conductive anode body 12 preferably formed from tungsten or a tungsten base alloy. A conduit 14 extends through the anode body 12. The anode body 12 is arbitrarily divided into three portions by broken phantom lines. There is a converging upstream portion 18 and a diverging downstream portion 46. A constrictor 40 has a first end 52 adjacent to the converging upstream portion 18. An opposing second end 54 of the constrictor 40 is adjacent to the diverging downstream portion 46. The diameter of the first end 52 is larger than the diameter of the second end 54. There is a continuous reduction in the available cross-sectional area available for a propellant gas 16 flowing downstream through the conduit 14 between the cathode tip 38 and the diverging downstream portion 46. The propellant 16 is continuously accelerated, strengthening the gas dynamic forces driving the arc foot 36 toward and through the constrictor 40.

A second effect of the higher velocity in both the axial and tangential direction of the propellant gas 16 is a reduction in the density of the gas along the conduit centerline and reduced resistance to arc formation. The arc is formed at a higher voltage and lower current. Also, since the centerline propellant density is less, the amount of heat transferred to the anode body 12 is reduced and excursions of the stable arc 48 to the surfaces of the anode due to natural instabilities are discouraged. The stable arc 48 remains well centered along the longitudinal axis 56 of the anode body.

Preferably, the converging walls 24 of the converging upstream portion 16 converge at an angle, "$\alpha$", between the converging walls 24 and the longitudinal axis 56 of between about 20° and 40°. Typically, $\alpha$ is about 30°.

A first inflection point 58 located at the first end of the constrictor 52 identifies a point where the rate of convergence changes typically decreasing. The diameter of the conduit 14 at the first inflection point 58 is sufficiently large to accommodate the tapered tip of the cathode. Typically, for a 10 kW arcjet, this diameter is in the range of from about 0.10 to about 0.15 inch.

The angle, "β", between the longitudinal axis 56 and the converging walls 24 downstream of the first inflection point 58 is determined by the diameter of the conduit at the first 52 and second 54 ends of the constrictor as well as the desired conduit length. A typical angle β is about one-half the value of α, preferably from about 10° to about 20°.

Within the constrictor portion 40 is a second inflection point 60 beyond which the angle, "θ", between the longitudinal axis 56 and the anode wall 24 approaches 0°. This parallel running portion of the constrictor walls is a result of machining limitations during manufacture. It is desirable for the length of this portion to be as close to zero as possible, since the beneficial effect of constantly accelerating propellent gas is lost.

A third inflection point 62 located at the second end 54 of the constrictor portion 40 identifies the point where the anode wall transitions from either constricting or parallel to diverging and represents the beginning of the divergent portion 46 of the anode body 12. The diameter of the conduit 14 at the third inflection point is any effective to generate a desired $I_{sp}$. A typical diameter in a 10 kW arcjet thruster is from about 0.04 inch to about 0.06 inch.

In a first region 64 of the constrictor 40, the distance between the first inflection point 58 and the second inflection point 60 has an axial length about equal to the diameter of the conduit at the first inflection point 52. In a typical 10 kW electrothermal arcjet thruster, the diameter at the inflection point 52 is about 0.125 inches and the first region 64 has an axial length of from about 0.10 inches to about 0.15 inches.

A second region 66 of the constrictor 40, the region between the second inflection point 60 and third inflection point 62 has an axial length less than that of the first region 64 and preferably as close to zero as possible. Preferably, the axial length of the second region 66 is from about 0.0005 inch to about 0.0025 inch.

The electrothermal arcjet thruster 50 reduces arcjet start times for a given mass flow rate. The enhanced propellant 16 gas dynamics, increased velocity in both the axial and tangential directions, and the lower density of the propellant gas on the conduit centerline combine to minimize the time the arc spends in a region downstream of the arc root and upstream of the constrictor exit identified by the third inflection point 62.

Both the operating life of the anode 12 and the cathode 22 are increased. The stability of the arc permits greater flexibility in sizing the constrictor diameter to produce the desired voltage characteristics. The stable electric arc 48 is effectively centered about the axis 56 so that it is possible to use a smaller diameter cathode 22 without a loss in arc stability and the resultant severe anode erosion. The reduction in cathode 22 diameter results in increased operating voltages and reduced current levels for a given power setting. Since the cathode surface erosion rate increases with increasing current level, the reduction in operating current lowers the arc erosion rate.

The life time of the anode body 12 is also increased. The anode geometry permits operation with a minimum constrictor length, the distance between the cathode tip 38 and first inflection point 58 is preferably from about 0.02 inch to about 0.04 inch compared with a conventional 10 kW electrothermal arcjet thruster in which the gap generally is about 0.05 inch. Reducing the constrictor length reduces the anode surface area where heat transfer rates from the electric arc to the anode body are the greatest.

Although, with the geometry of the anode of the arcjet thruster 50, the maximum heat transfer rate is larger than that of a conventional geometry arcjet, the constrictor surface area where maximum heat transfer occurs and the transit time of the propellant through the constrictor are both greatly diminished resulting in approximately equal heating of the anode body 12. In addition, radiative transfer of heat to the anode from the hot plasma in the region of the arc root is reduced due to increased absorption of the more dense gas near the anode surface. The reduction in total energy transferred to the anode results in lower anode temperatures increasing the anode life.

The specific energy, $I_{sp}$, can be increased above that of conventional electrothermal arcjet thrusters to achieve a higher specific impulse. Since the total anode thermal loading for a given input power is reduced and arc stability is improved, operation at higher specific energies (lower mass flow rates at the same power) and increased specific impulse are possible.

The improvement achieved with the anode geometry of the invention is further proven from the Examples which follow. The Examples are exemplary and not intended to limit the scope of the invention.

EXAMPLES

Electrothermal arcjet thrusters operating at a nominal power of 10 kW with hydrogen gas as the propellant were formed with the anode geometries illustrated in FIGS. 1 and 2.

For the conventional anode geometry, the anode walls 24 of the converging portion 18 had a convergence angle relative to the longitudinal axis of 30°. The diameter of the generally cylindrical constrictor was 0.050 inch and remained constant throughout the constrictor region 40. The length of the constrictor was equal to its diameter, 0.050 inch. The minimum gap between the cathode 22 and the anode wall 24 was 0.035 inch with the cathode tip located approximately at the entrance to the constrictor.

For the anode geometry of the arcjet thruster 50 of the invention illustrated in FIG. 2, the angle, α, was 30°, the angle, β, was 16.6°. The constrictor diameter at the first inflection point was 0.125 inch and the diameter at the third inflection point was 0.05 inch. The axial length of the first region was 0.125 inch and the second axial region was 0.02 inch. The tip of the cathode extended approximately to the first inflection point 58 defining the constrictor entrance.

Figure 3:
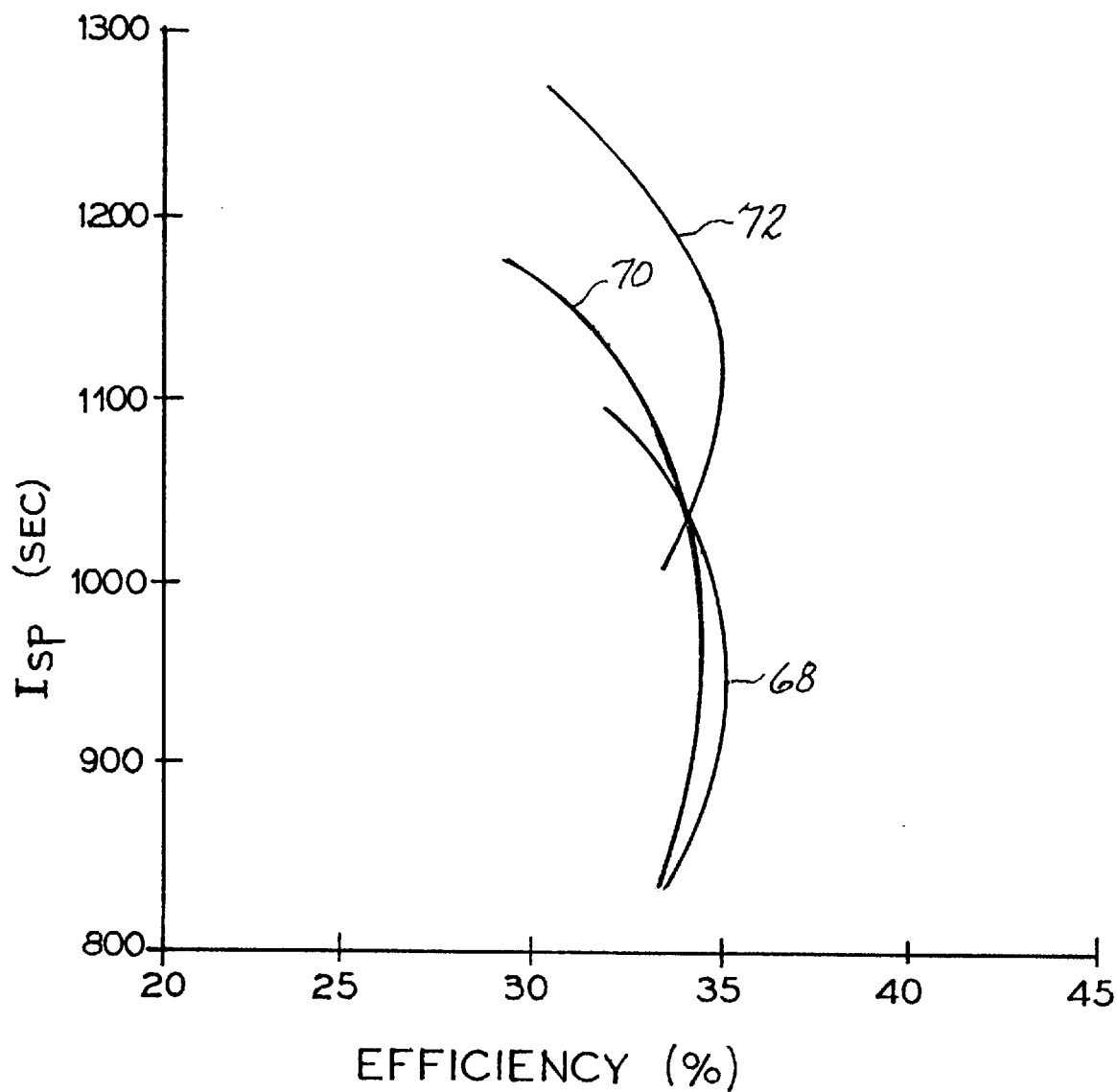
FIG. 3 graphically illustrates the relationship between specific impulse and efficiency for the electrothermal arcjet thrusters of FIGS. 1 and 2.

Both arcjet thrusters were powered and the maximum stable specific impulse determined. As illustrated graphically in FIG. 3, for the conventional arcjet thruster, represented by reference line 68, the maximum $I_{sp}$ was 1100 seconds. This was achieved at a specific energy of approximately 185 MJ/kg. Above 185 MJ/kg, erratic voltage and current fluctuations were observed.

Reference lines 70 and 72 represent arcjet thrusters having an anode geometry as in FIG. 2. The maximum $I_{sp}$ was between 1,175 and 1,250 seconds. For both runs using the anode geometry of the invention, a maximum specific energy of 250 MJ/kg was achieved without significant voltage or current fluctuation. Also, neither the cathode or the anode sustained measurable damage at these extreme conditions.

Figure 4:
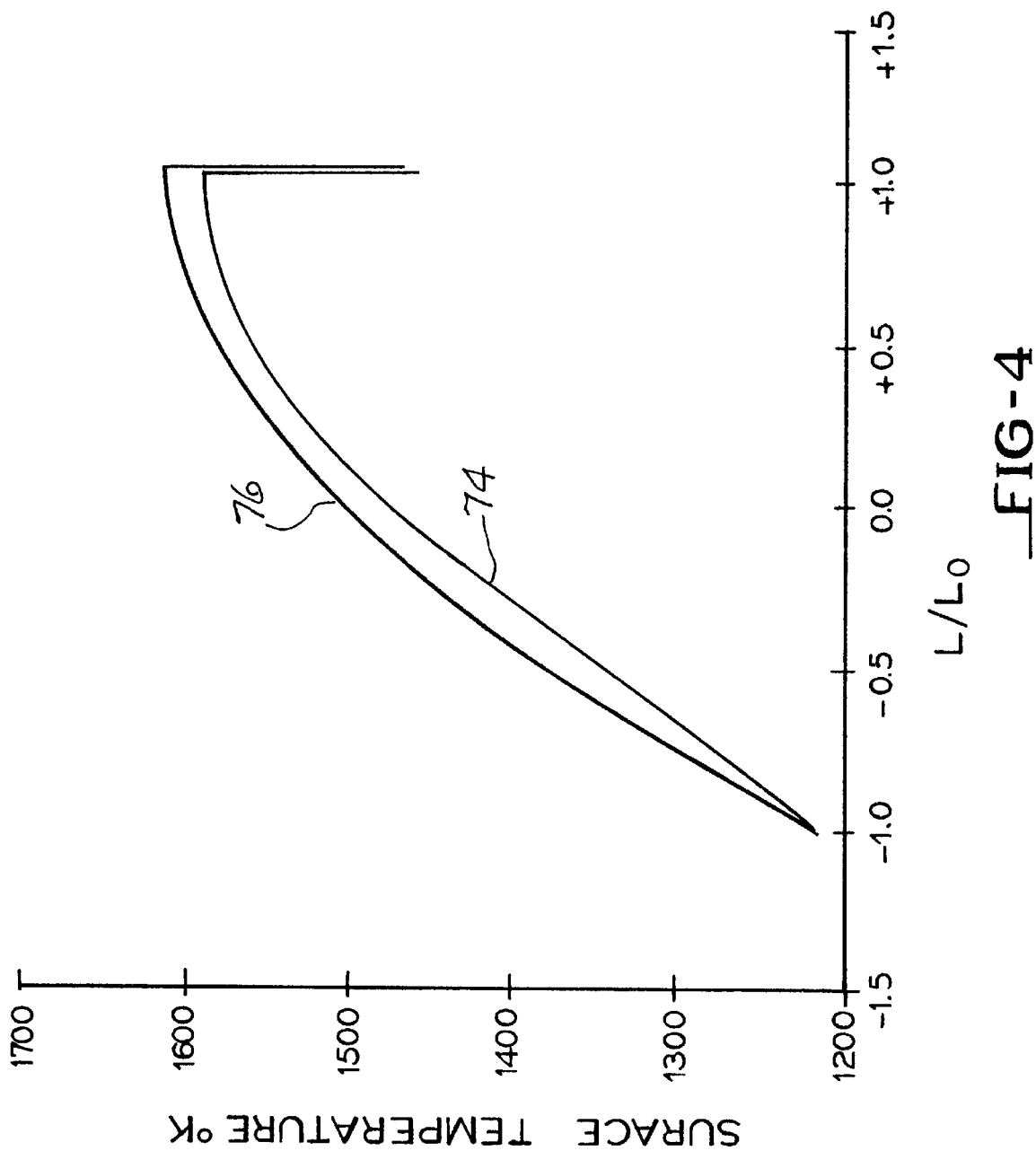
FIG. 4 graphically illustrates the anode temperature as a function of the distance from the constrictor exit for the electrothermal arcjet thrusters of FIGS. 1 and 2.

FIG. 4 illustrates that even at the higher operating conditions of the invention, the temperature of the anode body is not significantly increased. Reference line 74 represents the temperature at the surface of the anode body (reference numeral 75 in FIG. 1) while reference line 76 represents the temperature at the surface of the anode body having a geometry as in the invention (reference numeral 77 in FIG. 2. The horizontal axis of the graph is normalized as a ratio of the distance from the constrictor exit, identified in FIGS. 1 and 2 by the broken line separating the constrictor portion from the divergent portion), $L_0$, to the exhaust plane identified by the end of the divergent portion. Values of $L/L_0$ less than zero are in the constrictor upstream of the broken line while values of $L/L_0$ greater than zero are positions downstream of the constrictor.

The surface temperatures are comparable, differing by at most 20K–30K over the measured portion of the anode surface. Qualitatively, the external surface temperatures indicate similar thermal performance. The thermal performance of the constrictor of the invention is no worse than that of a conventional constrictor while the stable specific impulse is significantly higher.

It is apparent that there has been provided in accordance with this invention, an anode body for an electrothermal arcjet thruster having an improved constrictor geometry that fully satisfies the objects, features and advantages set forth herein before. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. An electrothermal arcjet thruster, comprising:
   an electrically conductive anode having a conduit extending therethrough, said anode including an upstream portion wherein walls of said conduit converge with a first angle of convergence, a downstream portion wherein said walls of said conduit diverge and a constrictor having a first end adjacent to said upstream portion and an opposing second end adjacent to said downstream portion wherein the diameter of said first end is greater than the diameter of said second end;
   a generally cylindrical cathode having a frusto-conical converging tip portion with a second angle of convergence wherein the second angle of convergence substantially matches the first angle of convergence, said generally cylindrical cathode extending through the conduit within said upstream portion of said anode;
   a propellant gas flowing through said conduit wherein the available cross-sectional area of said conduit is continuously reduced with the walls converging at substantially a single third angle of convergence for a majority of a length between the first a second ends of the constrictor, said third angle of convergence being smaller than said first angle of convergence; and
   a power supply generating a current effective to initiate an electric arc between said cathode and said anode.

2. The electrothermal arcjet thruster of claim 1 wherein said first end is at a first inflection point in the angle formed between said wall and a longitudinal axis of said anode and said second end is at a third inflection point in the angle formed between said wall and a longitudinal axis of said anode.

3. The electrothermal arcjet thruster of claim 2 wherein, moving in a downstream direction, the angle between said wall and a longitudinal axis of said anode changes from about 20°–40° to from about 10°–20° at said first inflection point.

4. The electrothermal arcjet thruster of claim 2 wherein, moving in a downstream direction, the angle between said wall and a longitudinal axis of said anode changes to diverging at said third inflection point.

5. The electrothermal arcjet thruster of claim 2 wherein said first inflection point identifies a point with a rate of convergence changes.

6. The electrothermal arcjet thruster of claim 4 wherein a second inflection point is disposed within said constrictor between said first inflection point and said third inflection point.

7. The electrothermal arcjet thruster of claim 6 wherein, moving in a downstream direction, the angle between said wall and a longitudinal axis of said anode changes from about 10°–20° to about 0° at said second inflection point.

8. The electrothermal arcjet thruster of claim 6 wherein a distance between said first inflection point and said second inflection point is about equal to the diameter of a shoulder of a cathode inserted into said conduit.

9. The electrothermal arcjet thruster of claim 8 wherein said electrothermal arcjet thruster is a 10 kW arcjet and a tapered cathode tip extends downstream from said cathode shoulder, said tapered tip terminating within about 0.02 inch of said first inflection point.

10. The electrothermal arcjet thruster of claim 9 wherein said constrictor has a first diameter at said first inflection point and a smaller third diameter at said third inflection point, the combination of said first and third diameters being effective to maintain said electric arc in a stable condition with an arc root attached to said tapered cathode tip and an arc foot diffusely attached to said downstream portion of said anode.

11. The electrothermal arcjet thruster of claim 10 wherein said first diameter is between about 0.10 inch and 0.15 inch and said third diameter is between about 0.04 inch and 0.06 inch.

12. An anode for an electrothermal arcjet thruster, comprising an electrically conductive body having a surface defining a conduit extending therethrough and including:
   an upstream portion of the conduit wherein said surface converges;
   a downstream portion of the conduit wherein said surface diverges;
   a constrictor portion of the conduit having:
      an upstream end adjacent to said upstream portion and having an upstream cross-sectional area; and
      an opposite downstream end adjacent to said downstream portion and having a downstream cross-sectional area less than the upstream cross-sectional area, the constrictor portion having a longitudinal length extending between such upstream and downstream ends, along substantially said length the surface having a single substantially uniform slope having an angle of convergence less than an angle of convergence of the upstream portion.

13. The anode of claim 12 wherein the substantially uniform slope has an angle of from about 10° to 20°.

14. The anode of claim 13 wherein the substantially uniform slope has an angle of 15° to 17°.

15. The anode of claim 12 wherein along substantially said length the surface converges at substantially a first angle which is about half of a convergence angle of the upstream portion.

16. An anode for an electrothermal arcjet thruster, comprising an electrically conductive body having a surface defining a conduit extending therethrough, said surface substantially symmetric about a longitudinal axis and including:
   an upstream portion wherein said surface converges from upstream to downstream;

a downstream portion wherein said surface diverges from upstream to downstream; and a constrictor portion having:
  an upstream end adjacent to said upstream portion and having an upstream diameter; and
  an opposite downstream end adjacent to said downstream portion and having a diameter less than the upstream diameter, the constrictor portion having a longitudinal length extending between such upstream and downstream ends, such length being about equal to the upstream diameter, along a majority of said length the surface having a single substantially uniform slope having an angle of convergence less than an angle of convergence of the upstream portion.

17. The anode of claim 16 wherein the substantially uniform slope has an angle of from about 10° to 20°.

18. An anode for an electrothermal arcjet thruster, comprising an electrically conductive body having a surface defining a conduit extending therethrough and including:

an upstream portion of the conduit wherein said surface converges;

a downstream portion of the conduit wherein said surface diverges;

a constrictor portion of the conduit having;
  an upstream end adjacent to said upstream portion and having an upstream cross-sectional area; and
  an opposite downstream end adjacent to said downstream portion and having a downstream cross-sectional area less than the upstream cross-sectional area, the constrictor portion having a longitudinal length extending between such upstream and downstream ends, along a majority of said length the surface having a single substantially uniform slope having a nonzero angle of convergence less than an angle of convergence of the upstream portion of the conduit.

19. An anode for an electrothermal arcjet thruster, comprising an electrically conductive body having a surface defining a conduit extending therethrough and including:

an upstream portion of the conduit wherein said surface converges;

a downstream portion of the conduit wherein said surface diverges;

a constrictor portion of the conduit having:
  an upstream end adjacent to said upstream portion and having an upstream cross-sectional area; and
  an opposite downstream end adjacent to said downstream portion and having a downstream cross-sectional area less than the upstream cross-sectional area, the constrictor portion having a longitudinal length extending between such upstream and downstream ends, along substantially said length the surface having a single substantially uniform slope and along substantially said length the surface converging at substantially a first angle which is about half of a convergence angle of the upstream portion.

20. An electrothermal arcjet thruster comprising:

an anode body having a surface defining a conduit extending therethrough and including:

an upstream portion of the conduit wherein said surface converges;

a downstream portion of the conduit wherein said surface diverges;

a constrictor portion of the conduit having:
  an upstream end adjacent to said upstream portion and having an upstream cross-sectional area; and
  an opposite downstream end adjacent to said downstream portion and having a downstream cross-sectional area less than the upstream cross-sectional area, the constrictor portion having a longitudinal length extending between such upstream and downstream ends, along a majority of said length the surface having a single substantially uniform nonzero slope having an angle of convergence less than an angle of convergence of the upstream portion; and
  a cathode having a tip portion, said cathode extending through the conduit within said upstream portion of said anode, the tip portion located upstream of the upstream end of the constrictor portion.

* * * * *